Oct. 1, 1935.   J. E. TRAINER ET AL   2,015,699
FURNACE
Filed Nov. 10, 1931   6 Sheets-Sheet 1
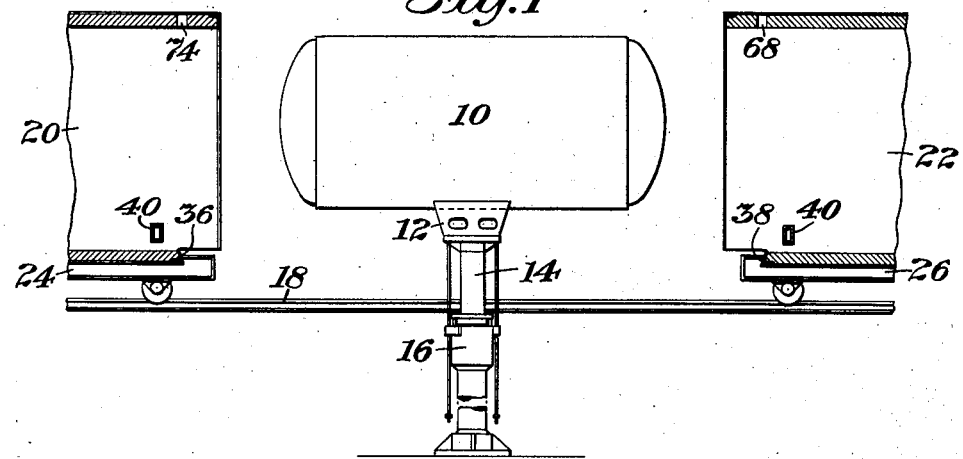
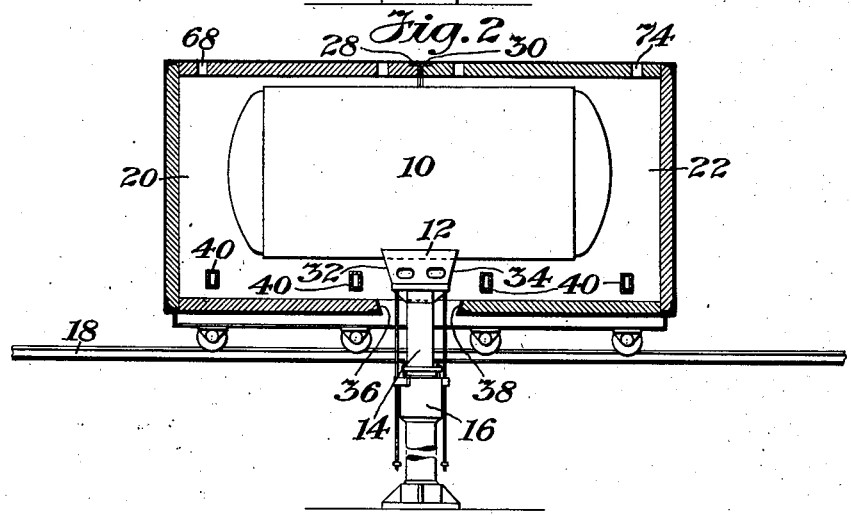
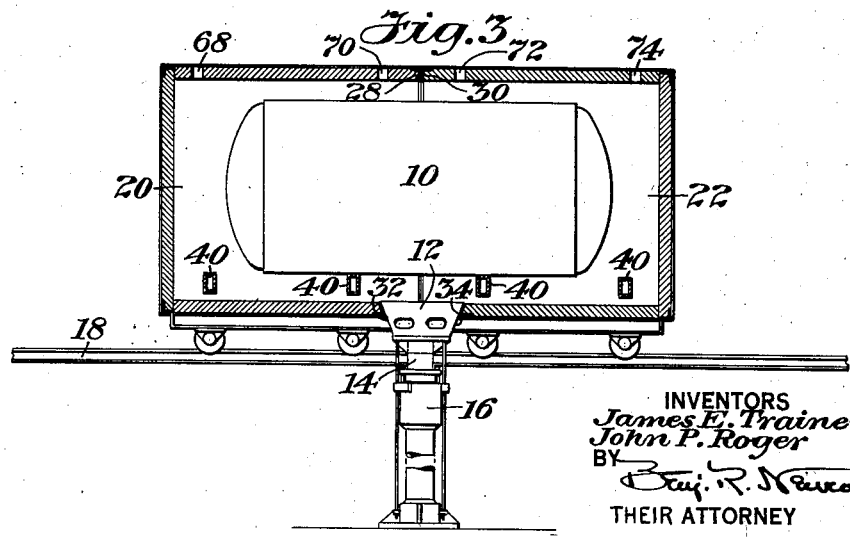
INVENTORS
James E. Trainer
John P. Roger
BY
THEIR ATTORNEY

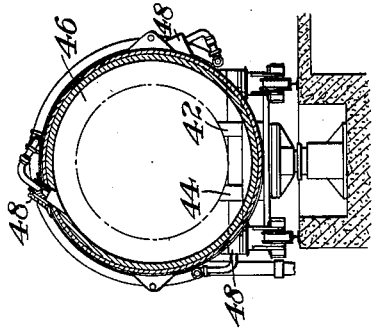
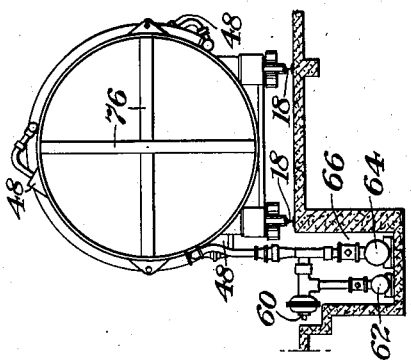
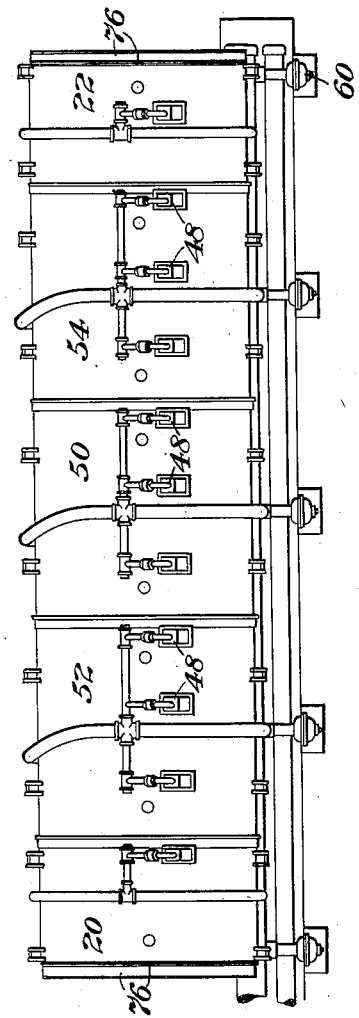
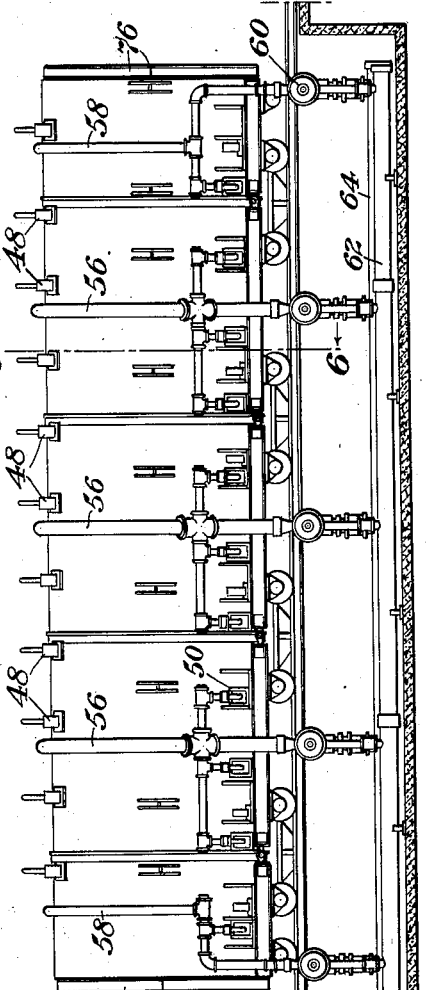

Oct. 1, 1935.  J. E. TRAINER ET AL  2,015,699

FURNACE

Filed Nov. 10, 1931  6 Sheets-Sheet 3

INVENTORS
James E. Trainer
John P. Roger
BY
THEIR ATTORNEY

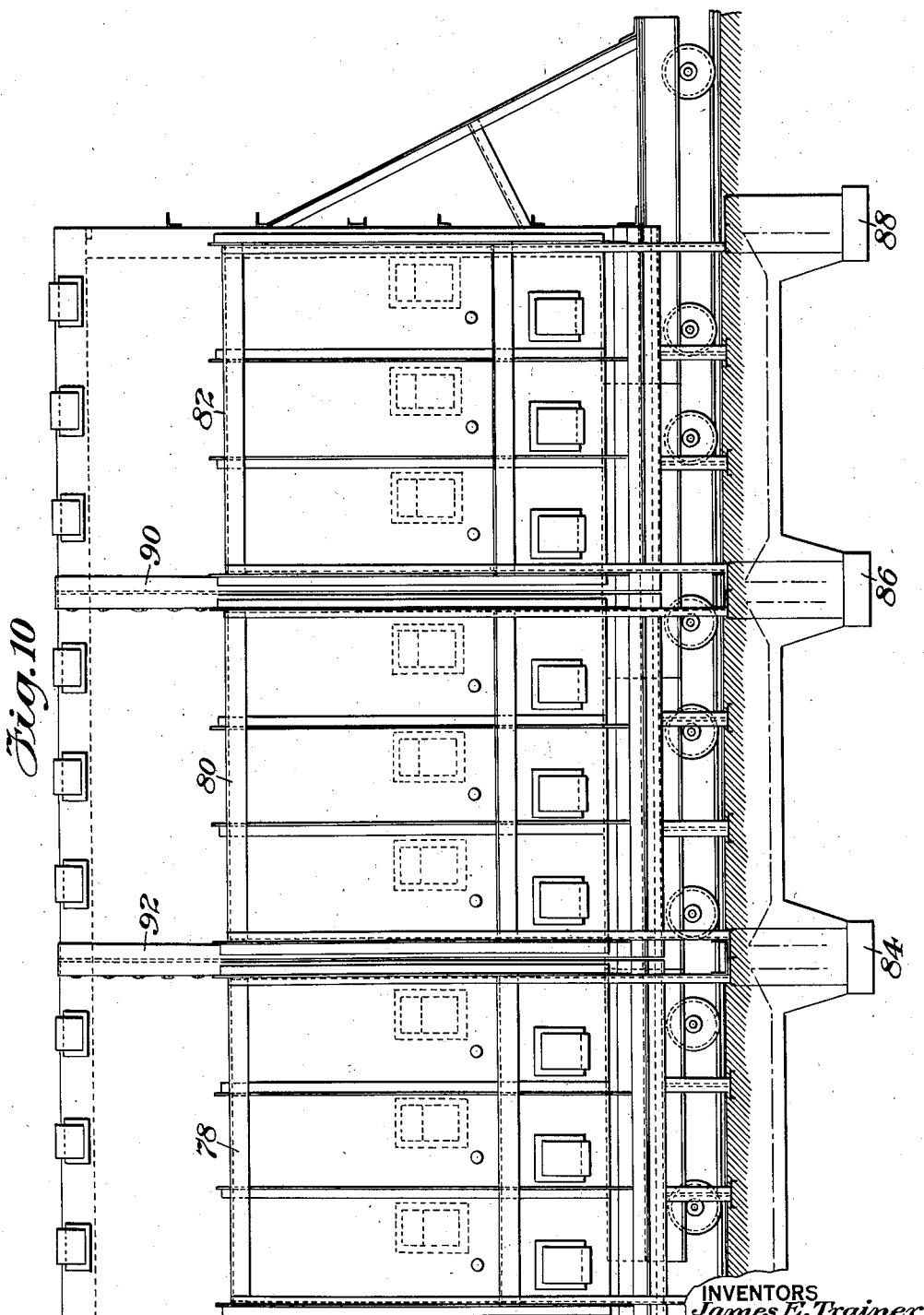

Oct. 1, 1935.    J. E. TRAINER ET AL    2,015,699
FURNACE
Filed Nov. 10, 1931    6 Sheets-Sheet 5
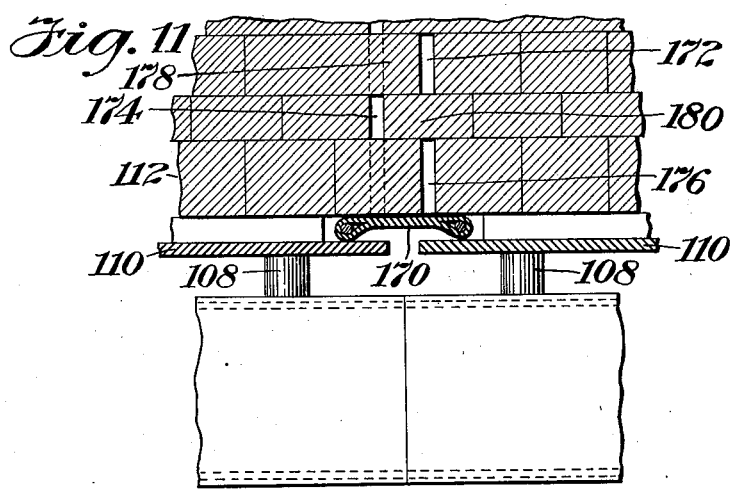
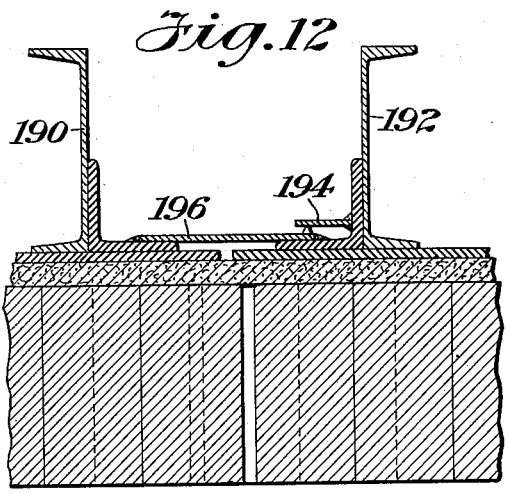
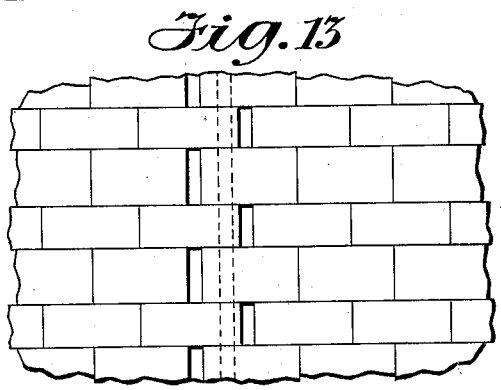
INVENTORS
James E. Trainer
John P. Roger
BY
THEIR ATTORNEY Oct. 1, 1935.  J. E. TRAINER ET AL  2,015,699
FURNACE
Filed Nov. 10, 1931   6 Sheets-Sheet 6
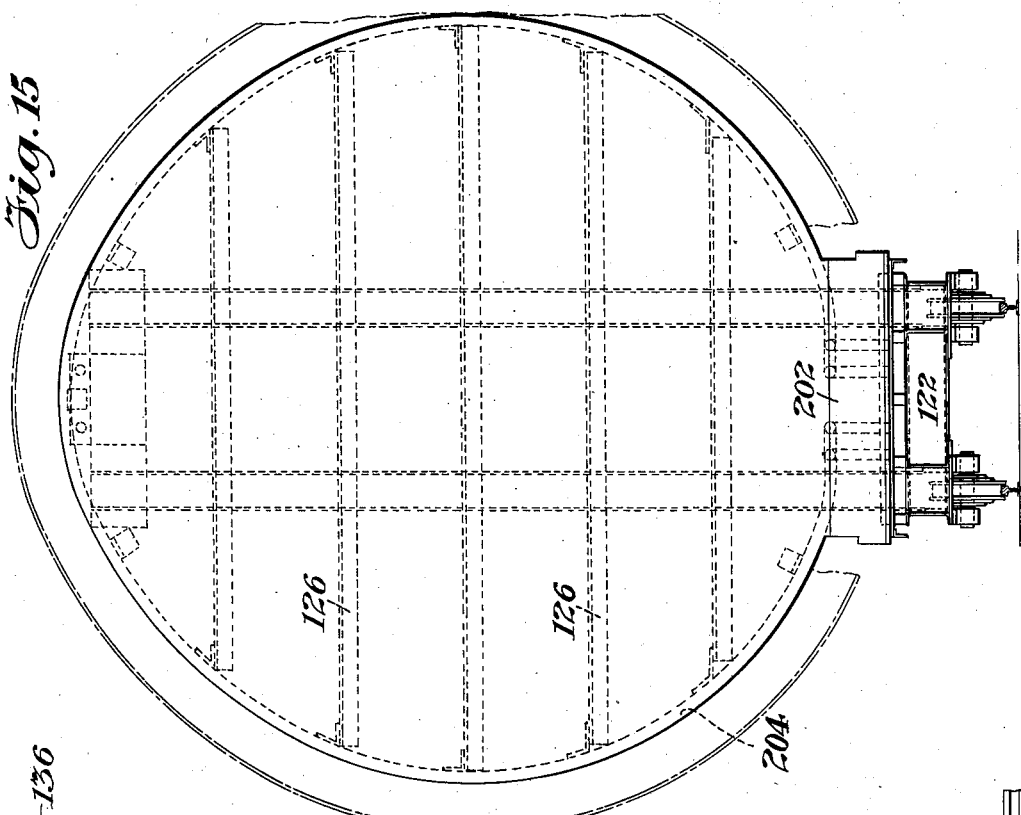
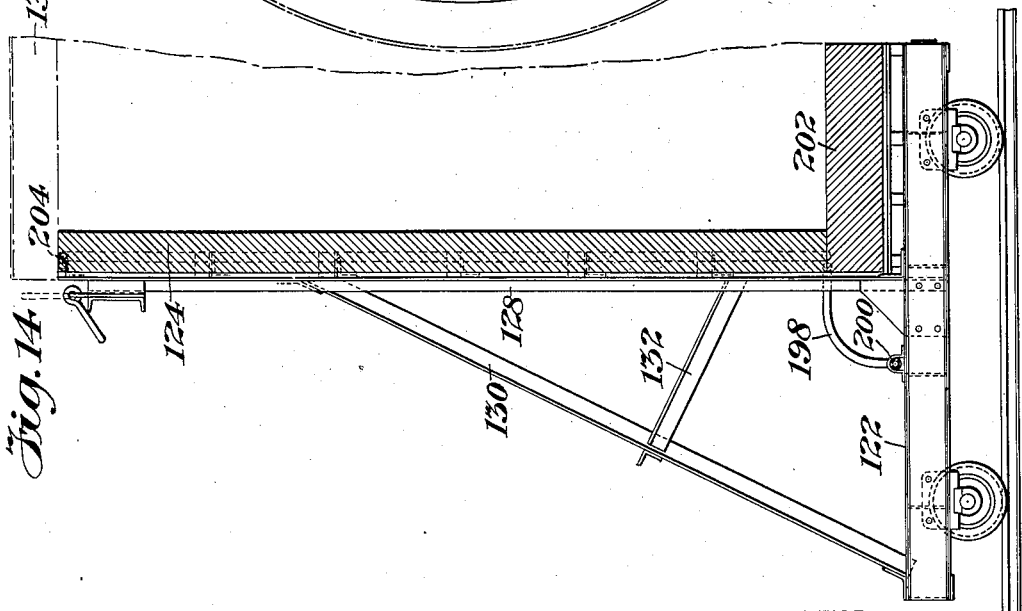
INVENTORS
James E. Trainer
John P. Roger
BY
THEIR ATTORNEY Patented Oct. 1, 1935

2,015,699

UNITED STATES PATENT OFFICE 2,015,699

FURNACE

James E. Trainer, Fairlawn, and John P. Roger, Barberton, Ohio, assignors to The Babcock & Wilcox Company, Bayonne, N. J., a corporation of New Jersey Application November 10, 1931, Serial No. 574,074

24 Claims. (Cl. 263—6)

This invention is concerned with apparatus for the heat treatment of such large metallic bodies as pressure vessels for large steam generating plants.

It is an object of the invention to promote the heat treatment of large metallic bodies without the necessity of rebuilding parts of the furnace construction each time one of the bodies is heat treated.

The invention is intended to promote the economy and facility with which practical and successful pressure vessels may be manufactured.

It is a further object to provide a sectional furnace construction the sections of which may be moved into contact so as to complete a furnace enclosing a boiler drum to be heat treated.

Further objects of the invention will appear as the following description proceeds.

The invention is described with reference to the accompanying drawings, in which:

Fig. 1 is a diagrammatic view partly in elevation and partly in vertical section illustrating the manner in which the boiler drum is held in position while the furnace sections are moved towards each other to enclose the drum.

Fig. 2 is a vertical sectional view of the furnace showing the drum and its elevating means in side elevation after the furnace sections have been moved into contact.

Fig. 3 is a view similar to Fig. 2 indicating the elevator head as having been lowered to allow the drum to be supported upon cradles within the furnace, and to close the bottom of the furnace.

Fig. 4 is a plan of a sectional furnace comprising a plurality of intermediate sections interposed between such sections as those shown in Figs. 1 and 2.

Fig. 5 is a side elevation of the furnace construction indicated in Fig. 4 with the separate fuel lines indicated for each section of the furnace.

Fig. 6 is a transverse vertical section taken on the line 6—6 of Fig. 5.

Fig. 7 is an end elevation showing the furnace arrangement of the fuel and air lines together with the car construction upon which the furnace sections are carried.

Fig. 10 is a side elevation indicating several furnace sections and a carriage maintaining the furnace end wall in position to close one end of the furnace.

Fig. 11 is a vertical sectional view taken on the line 11—11 of Fig. 9 and indicating the gas tight expansion joint construction between adjoining carriages which form the bottom of the furnace.

Fig. 12 is a detailed view showing in section the expansion joint construction at the position indicated by the line 12—12 of Fig. 8.

Fig. 13 is an elevation of a part of the furnace wall viewed from the interior of the furnace.

Fig. 14 is a view partly in the nature of a vertical section showing the end of the furnace construction with the end wall in place closing the furnace.

Fig. 15 is an end elevation of the furnace with the structure indicated in Fig. 14 in operative position.

Figure 8:
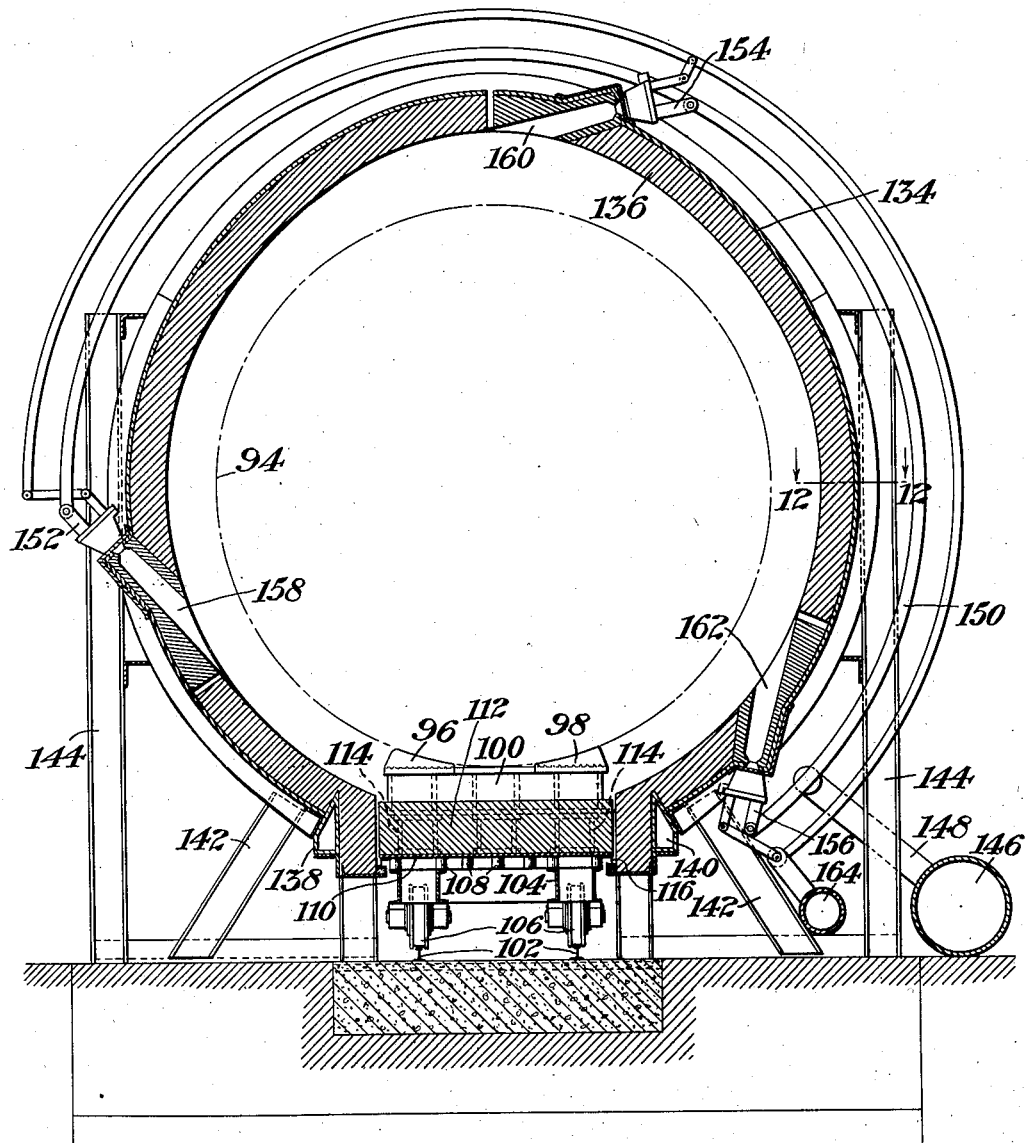
Fig. 8 is a transverse vertical section through a furnace in which the bottom of the furnace is formed by portable carriages which are movable along a track to place a boiler drum within a stationary furnace casing, and to complete the furnace enclosure.

Fig. 1 discloses the boiler drum 10 held in elevated position upon the head 12 at the top of the ram 14 of the hydraulic jack 16. The jack preferably extends upwardly between the rails of a track 18 so as to maintain the drum in alignment with furnace sections 20 and 22 mounted upon carriages or trucks 24 and 26 running upon the track 18.

The furnace sections 20 and 22 are preferably alike in construction with their facing ends provided with furnace sealing constructions 28 and 30. When the trucks 24 and 26 are moved towards each other, the furnace sections contact to complete a furnace enclosure around the drum as indicated in Fig. 2.

The head 12 is preferably of tapering construction as indicated in the drawings. It has upwardly diverging side faces 32 and 34 which contact with similarly formed faces 36 and 38 formed at the adjoining ends of the bases of the furnace sections. When the head 12 is dropped to the position indicated in Fig. 3 of the drawings, the illustrative construction forms a substantially gas tight seal for closing the opening in the central part of the bottom of the furnace.

When the elevating means is positioned as indicated in Fig. 3 of the drawings, the drum rests upon the supports or cradles 40 preferably extending transversely of the furnace sections at their lower portions. As indicated in Fig. 6 of the drawings parts 42 and 44 of these cradles have curved faces corresponding to the curvature of the drum so as to center the drum with respect to the furnace sections. An annular combustion chamber 46 is thus formed about the drum.

The drum is heated by burners 48 arranged to project burning fuel across the combustion chamber 46 in directions which are substantially tangential to the drum. Preferably there are several of such burners for each furnace section. The plan view Fig. 4 indicates three of the burners 48 provided in the tops of each of the intermediate sections 50, 52, and 54, and one burner provided in the top of each of the end sections 20 and 22.

As shown the burners are arranged in groups of three circumferentially about each furnace section, the burners in each group being spaced circumferentially approximately 120° and are staggered relative to the burners of adjacent groups to increase the tendency toward spiral gas flow. Fig. 5 of the drawings indicates a row of burners 50 near the bases of the sections and substantially 120° removed from the top burners 48. In this way, the boiler drums are uniformly heated over their circumferential extent by gases which are moving in a spiral manner.

When the burners of the Fig. 3 furnace are considered with reference to gas movements in the furnace and about the drum, there are four sets of burners. Separate sets of these burners discharge their gases through vent holes 68, 70, 72, and 74, which are indicated in Figs. 2 and 3 of the drawings. In the structure here illustrated there are four sets of burners producing gas movements which take place in two right hand turns and two left hand turns. Sets of burners adjacent the meeting edges of the furnace sections are so arranged that the gas movements set up thereby are convergent. The gases from these sets of burners move towards the gas outlets near the center of the furnace. With the four sets of burners illustrated, the remaining gas movements are from the center of the furnace outwardly towards the ends of the furnace, the gases escaping through the outlets 68 and 74 at the top and near the ends of the furnace.

Each furnace section as indicated in Figs. 4 and 5 is provided with its individual fuel lines. The intermediate sections of the circumferential fuel lines 56 lead around the sections to the different burners. The end sections have similar circumferential fuel lines 58. All of these separate lines have connections 60 leading from mains such as the air and fuel mains 62 and 64 which extend alongside the track 18 in a pit 66 as indicated in Fig. 7 of the drawings.

Figs. 4 and 5 indicate a furnace comprising five sections two of which are end sections with closures such as those indicated in Fig. 7. The end closures are maintained in position by reinforcing bars 76 which are shown as extended at right angles to each other across the ends of the furnace.

In the modification illustrated in Figs. 8 to 15 inclusive, the furnace comprises a number of similar intermediate sections 78, 80, and 82. These sections are not mounted upon trucks. They are fixed structures supported on bases 84, 86 and 88. They are indicated as having their facing ends joined by collars 90 and 92.

In the latter embodiment of the invention, a drum 94 is mounted upon the centering blocks 96 and 98 of a saddle 100 placed upon a carriage running on the rails 102. This carriage consists of the frame 104 upon which the wheels 106 are journalled. The frame is a support for a plurality of short metallic column blocks 108 upon the tops of which rest the steel bottom plate 110. This plate is surmounted by refractory material such as the refractory bricks indicated at 112. Metallic uprights such as those indicated in dotted lines in Fig. 8 of the drawings at 114 preferably extend up through the refractory material 112 to afford adequate support for the saddle 100.

The drum to be heat treated is mounted upon one or more of these carriages which are then moved along until the drum is centrally located within the furnace. As the drum moves along its outwardly extending marginal flanges 116 cooperate with the loose material 118 affording a seal for preventing the downward escape of heating gases from the furnace. The material 118 rests within the groove formed by the inward extension of the channel 120 as illustrated in Figs. 8 and 9 of the drawings.

After the drum is centered within the furnace, end trucks 122 are moved towards the ends of the furnace. When the drum is shorter than the furnace, the end trucks may be moved considerably within the furnace ends. These trucks are indicated as carrying refractory walls 124 which are adapted to fit tightly against the wall forming the sides of the furnace. In Fig. 14 one of these end walls is shown in furnace closing position at an end of the furnace. The refractory material of the end wall is preferably supported by cross pieces 126 maintained in position by uprights 128. These uprights are secured by braces 130 and 132. When a refractory floor longer than the floor 202 is used, the braces and uprights are placed at different positions on the end truck.

Figure 9:
Fig. 9 is a detailed vertical section indicating the furnace seal between the movable carriages and the walls forming the carriage runway at the bottom of the furnace.

As indicated in Fig. 8 of the drawings, the furnace has a circular shell 134 inside of which is a refractory lining 136. When this lining is made of fire brick, it has a tremendous weight, and adequate provision must be made for maintaining this great mass. In the present instance, the brick lining is supported at the lower side of the circular shell. It is supported by the channels 120 and the longitudinals 138 and 140 and maintained in position by supports 142 and uprights 144. Horizontal thrusts created by the lining mass are taken care of by the structural members 138 and 140 relieving the refractory pier resting on the channel 120 of the horizontal thrust.

An air main is indicated at 146 as located at one side of the furnace. From this main, a lateral 148 leads to an air conduit 150, from which branches 152, 154 and 156 supply the burners 158, 160 and 162 with air. Similar connections supply the burners with fuel from the fuel main 164.

Fig. 11 indicates a bottom expansion joint seal between the adjoining metallic plates 110 which rest upon adjacent carriages. The heat transmitted from the furnace through the refractory 112 to the plates 110 is distributed and dissipated by means of the illustrative arrangement of the columns 108, this arrangement of elements also affording a passage for air currents between the trucks or carriages and the furnace.

The heat resisting member 170 overlaps the plates 110 and extends across the adjacent ends of the furnace sections. In the structure here illustrated the refractory bricks of adjacent sections are overlapped so that the meeting ends of adjacent sections are interlocked as indicated by the spaces 172, 174 and 176. In this particular instance, such a brick as 178 is mounted on the left hand carriage and overlaps a contiguous brick 180 mounted upon the right hand carriage.

Fig. 12 indicates an expansion joint seal structure in the furnace shell. Between the circumferential supports 190 and 192 there are overlapping plates 194 and 196 which cooperate to form exterior junctures of the shells overlapping adjoining parts of the furnace. The end walls 124 are so mounted on the carriages that they may be fixed to the cars or they may be adjustable with respect thereto so that they may be placed at any point relative to the car, thus providing for furnaces of varying lengths. When a short drum is to be treated, the end wall 124 is placed inwardly of the end of the wall having the refractory lining 136.

When the circular tube 204 is embedded in the end wall a cooling medium may be circulated therethrough and through the connection 198 to prevent excessive end wall destruction. This tube also acts as a confining band.

While this invention has been described with particular reference to the foregoing structures shown in the drawings, it is to be appreciated that it is not limited thereto, but that it is of a scope commensurate with the scope of the sub-joined claims.

What is claimed is:

1. In apparatus for the heat treatment of large metallic bodies such as pressure vessels, like furnace sections, means for portably mounting the sections for movement toward each other to complete a furnace enclosure around a pressure vessel held in elevated position upon a vertically movable means for temporarily supporting the pressure vessel while the sections are being moved into furnace forming positions.

2. In apparatus for heat treating large metallic bodies such as pressure vessels, furnace sections of like construction in cross section, separate trucks for the separate sections to enable the sections to be brought together along a track to enclose a boiler drum, elevating means for holding the drum in position to be enclosed by the sections, supports in the sections for sustaining the drum centrally of the sections when said means has lowered the drum, parts of the sections co-operating with said means to seal the bottom of the furnace when said means is lowered, and burners projecting burning gases tangentially of the drum.

3. Portable and sectional furnace equipment for the heat treatment of boiler drums comprising, in combination, a plurality of open ended furnace sections of like construction, means for portably mounting said sections on the same track, means on the meeting edges of the sections to form a substantially gas tight seal when the sections are moved into contact to form a complete furnace enclosure, elevating means adjacent the sections for raising and lowering a boiler drum to be heat treated within the furnace, a drum holding support carried by the elevating means and projecting within the furnace space when in contact with the drum, means on the sections to contact with the support when the latter is lowered to cause the support to form a continuation of the furnace wall, and burners carried by the sections for projecting burning gases substantially tangentially with respect to the drum.

4. Heat treating equipment for large objects such as boiler drums comprising, in combination, rails forming a track, drum elevating and lowering means extending upwardly between the rails of the track and having a head at its upper end adapted to maintain a boiler drum centered with its axis parallel to the rails, furnace sections adapted to enclose the drum when moved toward the elevating means with the drum maintained thereon, means for portably mounting the furnace sections for travel along the track, means along facing edges of the sections adapted to form a substantially gas tight seal when the sections are in contact, supports extending across the sections and adapted to maintain the boiler drum centrally positioned within the furnace when the elevating means is lowered out of contact with the drum, and formations including notches in the meeting portions of the sections forming a substantially gas tight seal with the head of the elevating means when the latter is lowered out of contact with the drum.

5. A portable and sectional furnace equipment for the heat treatment of boiler drums comprising, in combination, a plurality of open ended furnace sections of like construction, means for portably mounting said sections on the same track, means on the meeting edges of the sections to form a substantially gas tight seal when the sections are moved into contact to form a complete furnace enclosure, elevating means adjacent the sections for raising and lowering a boiler drum to be heat treated within the furnace, a drum holding support carried by the elevating means and projecting within the furnace space when in contact with the drum, means on the sections to contact with the support when the latter is lowered to cause the support to form a continuation of the furnace wall, and burners carried by the sections for projecting burning gases substantially tangentially with respect to the drum.

6. In equipment for the heat treatment of long cylindrical boiler drums, a plurality of hollow cylindrical furnace sections of like construction, means on the sections for forming gas tight expansion joint constructions between the sections when they are brought into end to end contact, spaced walls at the lower parts of the sections for providing a runway for cars moving a boiler drum into position within the sections, cooperating structures on the cars and the walls to form a gas tight seal as the cars are moved in position within the furnace, and upright furnace walls carried by the cars for forming enclosures for the furnace sections.

7. Apparatus for the manufacture of steel pressure vessels comprising, in combination, a plurality of cars carrying furnace sections adapted to complete a furnace enclosure around a boiler drum when the cars are moved toward each other, and transverse cradles carried by the cars for maintaining a boiler drum centrally of the furnace, the car carried sections constituting substantially the entire furnace enclosure.

8. Apparatus of the character described, comprising, in combination, similar furnace sections adapted to be joined and brought into alignment to form a pressure vessel treating furnace, a plurality of trucks carrying the furnace sections mounted for movement on the same track, fuel burners projecting through the walls of the furnace sections in a direction substantially tangential to a cylindrical boiler drum mounted within the sections, and transverse cradles carried by the trucks for maintaining and centering a cylindrical boiler drum within the furnace enclosure.

9. In furnace equipment for the heat treatment of large cylindrical boiler drums, open ended hollow cylindrical furnace sections, means associated with the ends of the sections to form substantially gas tight expansion joints between the sections, spaced walls extending outwardly from the lower portions of the furnace sections and forming an opening for the movement of cars through the furnace, parallel tracks below said opening for supporting cars for travel into the furnace, cars in the nature of railway cars for travel upon said tracks, heat insulating bases on the cars, aligned cradles on the cars for supporting a boiler drum with its walls spaced uniformly from the furnace walls, and spaced metallic supports sustaining said bases on the cars and acting to provide for air circulation between the cars and the bases to prevent overheating of the cars.

10. In furnace equipment for the heat treatment of large cylindrical boiler drums, open ended hollow cylindrical furnace sections, means associated with the ends of the sections to form substantially gas tight expansion joints between the sections, spaced walls extending outwardly from the lower portions of the furnace sections and forming an opening for the movement of cars through the furnace, parallel tracks below said opening for supporting cars for travel into the furnace, cars in the nature of railway cars for travel upon said tracks, heat insulating bases on the cars, aligned cradles on the cars for supporting a boiler drum with its walls spaced uniformly from the furnace walls, spaced metallic supports sustaining said bases on the cars and acting to provide for air circulation between the cars and the bases to prevent overheating of the cars, a metallic bottom structure interposed relative to the bases and the tops of the supports, and metallic car frames upon which the supports rest, the combination of elements centering around the supports operating to prevent overheating of the cars.

11. A furnace comprising a plurality of similarly constructed interfitting furnace sections having aligned openings at their bases, a railway track beneath the openings, a work supporting railway car mounted on the track, a furnace bottom built on the car, means carried by the car and the sections for effecting furnace gas seals when the car is moved into position underneath the sections, and movably mounted furnace closures for the ends of the furnace formed by the sections.

12. In a heat treating furnace, a plurality of aligned furnace sections mounted on railway cars, elevating means having a part projectable upwardly between the rails of a track upon which said cars run, and formations on said cars and said elevating means for effecting gas tight seals for the furnace when the sections are moved so as to enclose a body held in elevated position by said means.

13. In a heat treating furnace, a plurality of aligned and refractory lined furnace sections, means for supporting a cylindrical body of metal with its walls equally spaced from the walls of the sections, fuel burners arranged in a plurality of groups for each section with the burners of each group uniformly distributed circumferentially of a section, and means for supplying fuel to the burners, the sections being formed with exhaust gas ports located at the ends of the sections so as to direct the exhaust gases in a plurality of right hand turns and a plurality of interposed left hand turns about the body of the furnace, the burners of adjacent groups being located between the exhaust ports for these groups, said burners projecting fuel so as to cause the furnace gases to move circumferentialy around a body in the furnace, while moving in opposite directions longitudinally of the body.

14. In a heat treating furnace, a plurality of aligned furnace sections being formed with aligned openings along their bases, a railway car carrying a furnace bottom movable within the opening, a body of pulverulent heat resisting material supported along one wall of said openings and means passed into said body of material by the relative movement of the car and the sections whereby the furnace bottom is moved into operative position.

15. In a heat treating furnace, a plurality of aligned furnace sections having a refractory lining including refractory bodies which overlap across the meeting ends of the sections when the latter are brought into contact, and means for burning fuel within the furnace, said overlapping bodies permitting the sections to be moved apart and to be brought together again to constitute a gas tight furnace.

16. In a heat treating furnace, a plurality of refractory lined sections mounted upon railway trucks so that they are adapted to be brought into alignment, means carried by the sections for projecting burning fuel in the sections, and refractory end walls adjustably supported upon additional railway cars for fitting within the ends of the sections at different positions to afford a furnace of the desired length.

17. In a furnace for heat treating large metallic bodies such as pressure vessels or boiler drums, portably mounted furnace sections having furnace sealing end structures, means apart from the sections for moving a drum or other body to be treated and maintaining it in such position that the sections may be moved to enclose it with a telescoping action, separate trucks for the separate sections movable along the same track to bring the sections into contact so that they form a combustion chamber enclosing the body, cooperating furnace sealing parts carried by the sections and said means to form a substantially gas tight seal when the drum is in position for the operation of the furnace, burners for the furnace sections, and connections whereby fuel and air are supplied to the burners when the sections are in their operative positions.

18. In a furnace for heat treating large metallic bodies such as pressure vessels or boiler drums, portably mounted furnace sections some of which have furnace sealing end structures, means apart from the sections for moving a drum or other body to be treated and maintaining it in such position that the sections may be moved to enclose it with a telescoping action, separate trucks for the separate sections movable along the same track to bring the furnace sections into contact so that they form a complete combustion chamber enclosing the body, cooperating furnace sealing parts carried by the sections and said means to form a substantially gas tight seal when the drum is in position for the operation of the furnace, burners for the furnace sections, and connections whereby fuel and air are supplied to the burners when the sections are in their operative positions, said means being movable through an opening in the combustion chamber to raise or lower the drum after the furnace sections are in furnace forming contact.

19. In a furnace for heat treating large metallic bodies such as pressure vessels or boiler drums, portably mounted furnace sections some of which have furnace sealing end structures, means apart from the sections for moving a drum or other body to be treated and maintaining it in such position that the sections may be moved to enclose it with a telescoping action, separate trucks for the separate sections movable along the same track to bring the furnace sections into contact so that they form a complete combustion chamber enclosing the body, cooperating furnace sealing parts carried by the sections and said means to form a substantially gas tight seal when the drum is in position for the operation of the furnace, burners for the furnace sections, and connections whereby fuel and air are supplied to the burners when the sections are in their operative positions, said means comprising an hydraulic jack having a head movable between the rails of the track.

20. In apparatus for heat treating a metallic body such as a boiler drum, furnace sections having end portions adapted to engage to form parts of the furnace combustion chamber, lifting mechanism for moving the body and maintaining it in a position to be telescoped by the sections when they are moved into their furnace forming positions, and trucks portably mounting the sections, at least one of the sections having an end portion recessed to form an opening through which said mechanism is operable after the sections are brought into their operative positions.

21. A heat treating furnace for stress-relieving such large metallic bodies as welded boiler drums, comprising, in combination, fuel burners, drum moving means constituting a portion of the furnace enclosure and exposed to hot gases when the furnace is in operation, a substantially cylindrical combustion chamber structure including separate furnace sections of like construction adapted to support the burners and presenting an opening in which the drum moving means moves relative to the chamber to place the drum in correct position for heat treatment, and interfitting parts carried by the chamber and said means and forming a substantially gas tight seal after said means is operated to put the drum in position for the operation of the furnace, the opening being in the central part of the bottom of the combustion chamber.

22. In apparatus for heat treating boiler drums or the like, interengageable furnace sections of like cross section, trucks portably mounting the furnace sections for movement on the same track so that combustion chambers of different lengths may be formed to treat drums of different lengths, and means for moving a drum and maintaining it in position to be telescoped by the sections, at least one of said sections being formed to present an opening through which said means is operable to move the drum after the sections are moved into their operative positions about the drum.

23. In a sectional furnace adapted to afford combustion chambers of different lengths in the heat treatment of boiler drums of different lengths, portable furnace sections movable along a single track and including furnace end forming means, means at the abutting ends of the sections to permit the sections to fit tightly in furnace forming relation, fuel and air lines extending along one side of the track and having spaced burner connections, circumferential sets of burners for the sections, and means establishing gas tight communication between each set of burners and an adjacent burner connection.

24. In a furnace adapted to form combustion chambers of different lengths for the heat treatment of such metallic bodies as boiler drums, portable enclosure sections of like cross section and having joint forming engaging ends, an hydraulic jack for elevating the drum, trucks mounting the sections for movement toward each other and toward the jack on the same track whereby a furnace is formed about the drum while it is supported by the jack, drum supports carried by the sections, at least one of the sections formed with a recess through which the jack is operable to lower the drum onto the supports, burners for the sections, and fuel and air lines extending along the track and connected to the burners.

JAMES E. TRAINER.
JOHN P. ROGER.